US012602874B2

(12) United States Patent
Xie

(10) Patent No.: US 12,602,874 B2
(45) Date of Patent: Apr. 14, 2026

(54) FRAGMENTATION MODEL GENERATION METHOD AND APPARATUS, AND DEVICE AND STORAGE MEDIUM

(71) Applicant: BEIJING ZITIAO NETWORK TECHNOLOGY CO., LTD., Beijing (CN)

(72) Inventor: Xuanmeng Xie, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 185 days.

(21) Appl. No.: 18/568,677

(22) PCT Filed: Jun. 22, 2022

(86) PCT No.: PCT/CN2022/100309
§ 371 (c)(1),
(2) Date: Dec. 8, 2023

(87) PCT Pub. No.: WO2023/279958
PCT Pub. Date: Jan. 12, 2023

(65) Prior Publication Data
US 2024/0212280 A1 Jun. 27, 2024

(30) Foreign Application Priority Data

Jul. 7, 2021 (CN) .......................... 202110767496.5

(51) Int. Cl.
*G06T 17/20* (2006.01)
*G06T 7/11* (2017.01)
*G06T 7/70* (2017.01)

(52) U.S. Cl.
CPC ................ *G06T 17/20* (2013.01); *G06T 7/11* (2017.01); *G06T 7/70* (2017.01);
(Continued)

(58) Field of Classification Search
CPC ......... G06T 19/20; G06T 7/11; G06T 17/205; G06T 7/70; G06T 17/20;
(Continued)

(56) References Cited

U.S. PATENT DOCUMENTS

| 2019/0088032 A1* | 3/2019 | Milbert ............... G06F 3/04815 |
|---|---|---|
| 2020/0089823 A1 | 3/2020 | Hunt et al. |

(Continued)

FOREIGN PATENT DOCUMENTS

| CN | 101441780 A | 5/2009 |
|---|---|---|
| CN | 102708584 A | 10/2012 |

(Continued)

OTHER PUBLICATIONS

Ferreira TD, Vianna SS. Collision of convex objects for calculation of porous mesh in gas explosion simulation. Journal of Loss Prevention in the Process Industries. Mar. 1, 2021;69:104347.*

(Continued)

*Primary Examiner* — Phu K Nguyen
(74) *Attorney, Agent, or Firm* — Astute IP Law Group

(57) ABSTRACT
Provided are a fragmentation model generation method and apparatus, an electronic device, and a storage medium. The method comprises: obtaining a three-dimensional mesh model of an object to be fragmented (S110); randomly sampling a plurality of three-dimensional points on the surface of the three-dimensional mesh model (S120); determining a cutting model on the basis of the plurality of three-dimensional points (S130); determining a first bounding box corresponding to a first surface patch of the surface of the three-dimensional mesh model, and determining a second bounding box corresponding to a second surface patch of the surface of the cutting model (S140); determining interaction information between the first surface patch and the second surface patch according to the coordinate
(Continued)

information of the first bounding box and the coordinate information of the second bounding box (S150); and generating a fragmentation model corresponding to the three-dimensional mesh model on the basis of the interaction information (S160).

17 Claims, 5 Drawing Sheets

(52) U.S. Cl.
CPC *G06T 2207/20021* (2013.01); *G06T 2210/12* (2013.01); *G06T 2210/21* (2013.01); *G06T 2210/56* (2013.01)

(58) Field of Classification Search
CPC ......... G06T 2219/2021; G06T 2210/12; G06T 2210/21; G06T 2207/20021; G06T 2210/56
USPC ......................................................... 345/418
See application file for complete search history.

(56) References Cited

U.S. PATENT DOCUMENTS

| | | | | |
|---|---|---|---|---|
| 2020/0225383 | A1* | 7/2020 | Mallet | G01V 20/00 |
| 2020/0303081 | A1* | 9/2020 | Przekwas | G16H 15/00 |
| 2022/0351463 | A1* | 11/2022 | Huang | G06V 20/647 |

FOREIGN PATENT DOCUMENTS

| | | | |
|---|---|---|---|
| CN | 102968813 A | 3/2013 |
| CN | 104091358 A | 10/2014 |
| CN | 112070908 A | 12/2020 |
| CN | 112652040 A | 4/2021 |

OTHER PUBLICATIONS

Felix D, Colwill I, Harris P. A fast and accurate model for the creation of explosion fragments with improved fragment shape and dimensions. Defence Technology. Feb. 1, 2022;18(2):159-69.*
Ugrčić M. Numerical simulation of the fragmentation process of high explosive projectiles. Scientific Technical Review. 2013;63(2):47-57.*
Wang H, Yu A, Feng C, Ling X, Chen G, Gu M, Zhu X. An Efficient CDEM-based method to calculate full time-space natural fragment field of shell-bearing explosives. International Journal of Impact Engineering. Mar. 1, 2022;161:104099.*
Zhou F, Molinari JF. Dynamic crack propagation with cohesive elements: a methodology to address mesh dependency. International Journal for Numerical Methods in Engineering. Jan. 7, 2004;59(1):1-24.*
Stroter D, Mueller-Roemer JS, Stork A, Fellner DW. OLBVH: octree linear bounding vol. hierarchy for volumetric meshes. The Visual Computer. Oct. 2020;36(10):2327-40.*
McLaurin D, Marcum D, Remotigue M, Blades E. Repairing unstructured triangular mesh intersections. International Journal for Numerical Methods in Engineering. Jan. 20, 2013;93(3):266-75.*
International Search Report (English translation) issued in PCT/CN2022/100309, dated Sep. 6, 2022, 2 pages provided.
Matthias Müller et al., "Real Time Dynamic Fracture with Volumetric Approximate Convex Decompositions" ACM Transactions on Graphics, Jul. 21, 2013, vol. 32, Issue 4, Article No. 115 pp. 1-10, https://doi.org/10.1145/2461912.2461934.

* cited by examiner

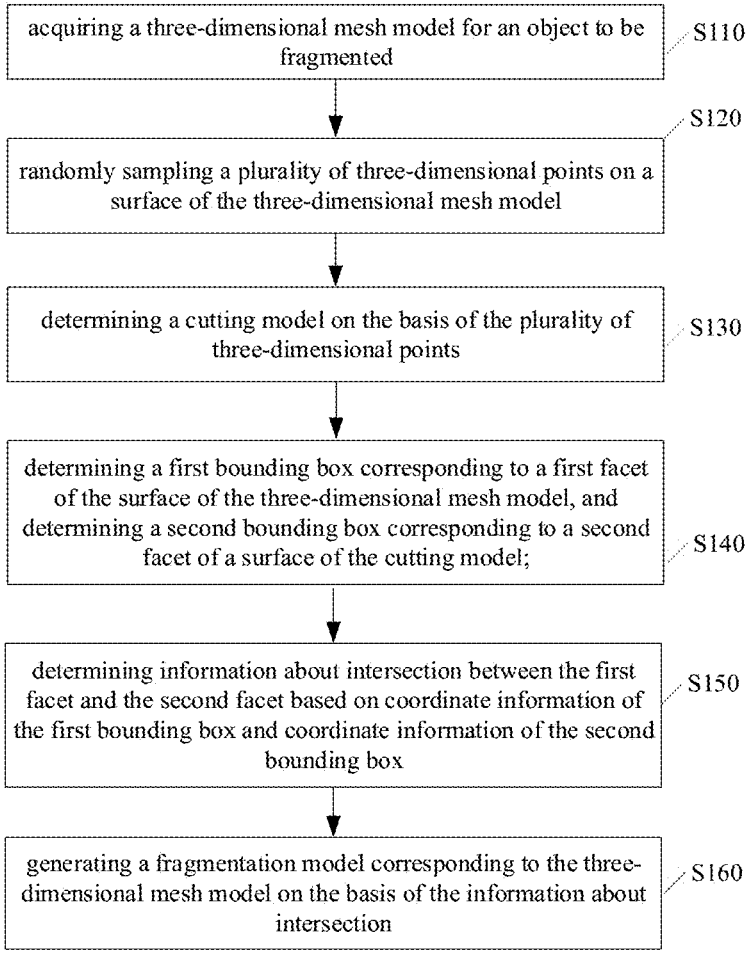

acquiring a three-dimensional mesh model for an object to be fragmented — S110 randomly sampling a plurality of three-dimensional points on a surface of the three-dimensional mesh model — S120 determining a cutting model on the basis of the plurality of three-dimensional points — S130 determining a first bounding box corresponding to a first facet of the surface of the three-dimensional mesh model, and determining a second bounding box corresponding to a second facet of a surface of the cutting model; — S140 determining information about intersection between the first facet and the second facet based on coordinate information of the first bounding box and coordinate information of the second bounding box — S150 generating a fragmentation model corresponding to the three-dimensional mesh model on the basis of the information about intersection — S160

Fig. 1

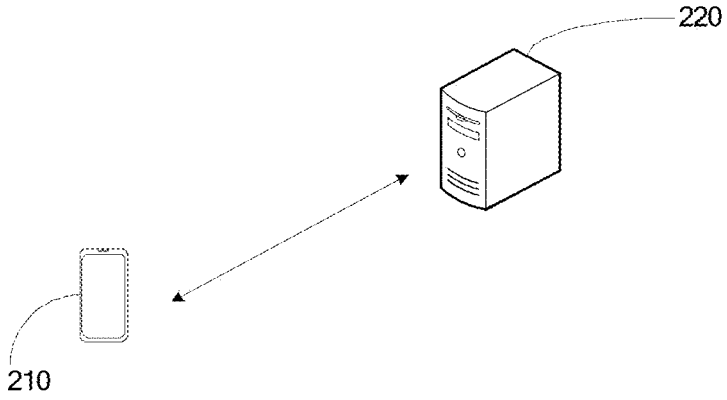

220

210

Fig. 2 determining a first cumulative area of a first facet of a surface of a three-dimensional mesh model ⟋ S310 determining a second cumulative area of each three-dimensional point based on the number of three-dimensional points and a total area of the surface of the three-dimensional mesh model ⟋ S320 determining a position of each three-dimensional point on the surface of the three-dimensional mesh model based on the first cumulative area and the second cumulative area ⟋ S330

Fig. 3

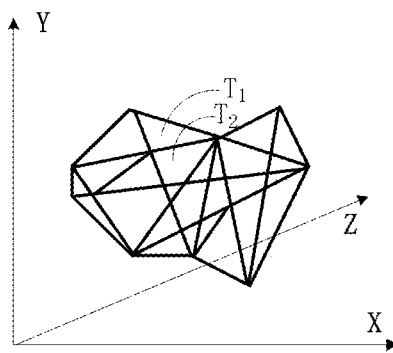

Fig. 4 generating a parallelogram corresponding to the triangle ⟋ S510 uniformly dividing the parallelogram into a plurality of sub-parallelograms with the same area, ⟋ S520 determining a third cumulative area of each sub-parallelogram ⟋ S530 determining a position of each three-dimensional point within the first facet based on the area offset information and the third cumulative area ⟋ S540

Fig. 5

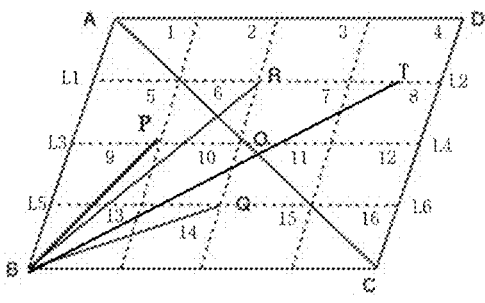

Fig. 6

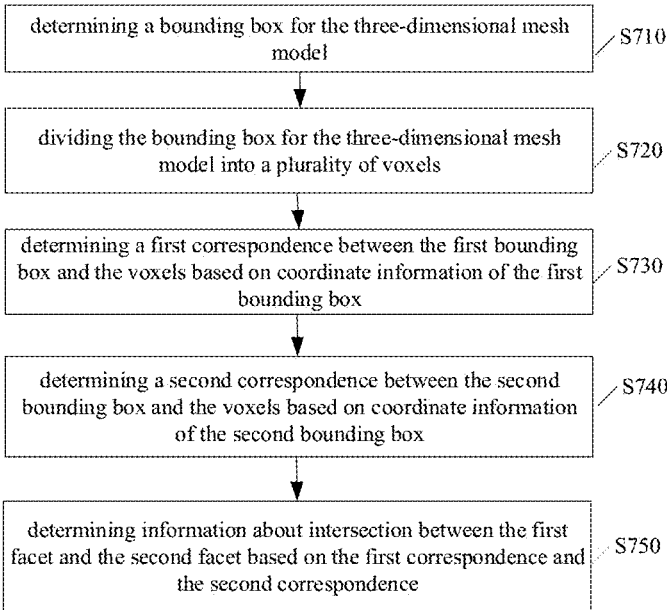

| | |
|---|---|
| determining a bounding box for the three-dimensional mesh model | S710 |
| dividing the bounding box for the three-dimensional mesh model into a plurality of voxels | S720 |
| determining a first correspondence between the first bounding box and the voxels based on coordinate information of the first bounding box | S730 |
| determining a second correspondence between the second bounding box and the voxels based on coordinate information of the second bounding box | S740 |
| determining information about intersection between the first facet and the second facet based on the first correspondence and the second correspondence | S750 |

Fig.7

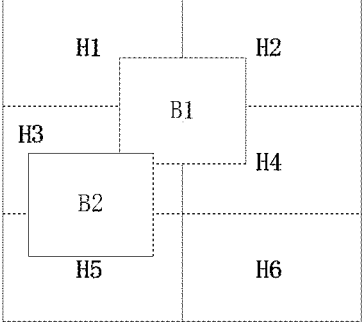

Fig. 8

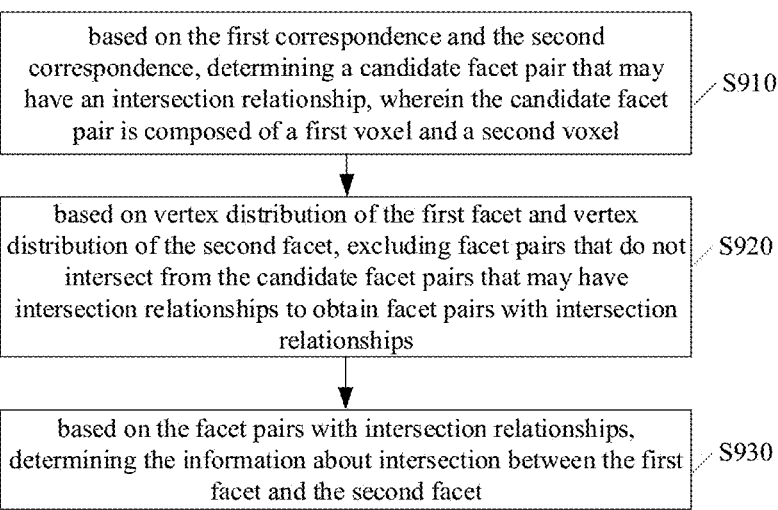

| based on the first correspondence and the second correspondence, determining a candidate facet pair that may have an intersection relationship, wherein the candidate facet pair is composed of a first voxel and a second voxel | S910 |

| based on vertex distribution of the first facet and vertex distribution of the second facet, excluding facet pairs that do not intersect from the candidate facet pairs that may have intersection relationships to obtain facet pairs with intersection relationships | S920 |

| based on the facet pairs with intersection relationships, determining the information about intersection between the first facet and the second facet | S930 |

Fig. 9

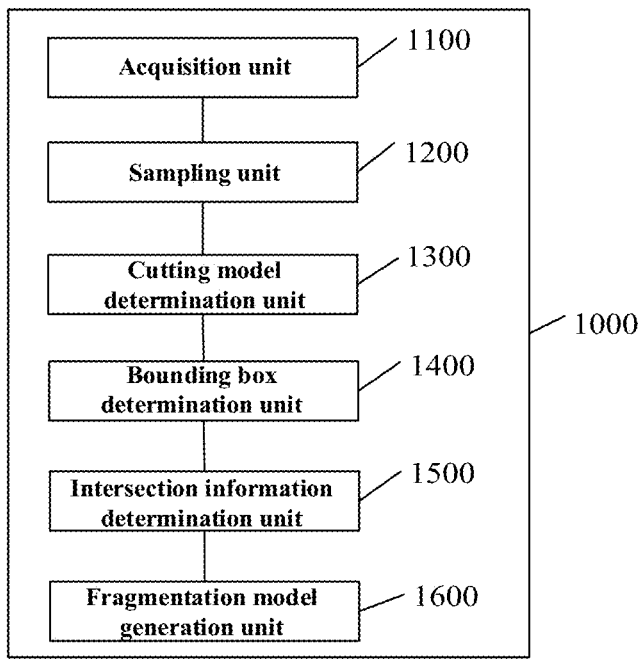

Acquisition unit — 1100

Sampling unit — 1200

Cutting model determination unit — 1300

Bounding box determination unit — 1400

Intersection information determination unit — 1500

Fragmentation model generation unit — 1600

FRAGMENTATION MODEL GENERATION METHOD AND APPARATUS, AND DEVICE AND STORAGE MEDIUM

CROSS-REFERENCE OF RELATED APPLICATION

This application is a national stage of International Application No. PCT/CN2022/100309, filed on Jun. 22, 2022, which claims the priority of a Chinese patent application No. 202110767496.5 filed in China Patent Office on Jul. 7, 2021, both of the aforementioned applications are hereby incorporated by reference in their entireties.

FIELD OF THE INVENTION

The present disclosure relates to the field of computer technology, and relates, for example, to fragmentation model generation method, apparatus, electronic device, and storage medium.

BACKGROUND

Nowadays, three-dimensional data models are widely used, often used in games and movies which need to apply blasting or explosion special effects to scenes and objects, implementation of blasting or explosive fragmentation special effects tend to consume a lot of computing resources and is difficult to be calculated in real time. At present, a pre-calculation way is mostly adopted, that is, a model for an object after fragmentation is pre-calculated, when the explosion or fragmentation special effects are applied to the object, a model for the object before fragmentation is replaced with the pre-calculated model for the object after fragmentation, the method leads to the replaced fragmentation model after object fragmentation has a fixed form of representation, while different fragmentation models cannot be flexibly rendered in accordance with the actual blasting situations of the object, and the user's experience is poor; secondly, the pre-calculated fragmentation model occupies a larger storage space, which also leads to occupy more hard disk and memory space, and the loading time is also longer.

DISCLOSURE OF THE INVENTION

Embodiments of the present disclosure provide fragmentation model generation method, apparatus, electronic device, and storage medium.

In a first aspect, an embodiment of the present disclosure provides a fragmentation model generation method, comprising:

acquiring a three-dimensional mesh model for an object to be fragmented;

randomly sampling a plurality of three-dimensional points on a surface of the three-dimensional mesh model;

determining a cutting model on the basis of the plurality of three-dimensional points;

determining a first bounding box corresponding to a first facet of the surface of the three-dimensional mesh model, and determining a second bounding box corresponding to a second facet of a surface of the cutting model;

determining information about intersection between the first facet and the second facet based on coordinate information of the first bounding box and coordinate information of the second bounding box; and

2 generating a fragmentation model corresponding to the three-dimensional mesh model on the basis of the information about intersection.

In a second aspect, an embodiment of the present disclosure also provides a fragmentation model generation apparatus comprising:

an acquisition unit configured to acquire a three-dimensional mesh model for an object to be fragmented;

a sampling unit configured to randomly sample a plurality of three-dimensional points on a surface of the three-dimensional mesh model;

a cutting model determination unit configured to determine a cutting model on the basis of the plurality of three-dimensional points;

a bounding box determination unit configured to determine a first bounding box corresponding to a first facet of the surface of the three-dimensional mesh model, and determine a second bounding box corresponding to a second facet of a surface of the cutting model;

an intersection information unit configured to determine information about intersection between the first facet and the second facet based on coordinate information of the first bounding box and coordinate information of the second bounding box; and a fragmentation model generation unit configured to generate a fragmentation model corresponding to the three-dimensional mesh model on the basis of the information about intersection.

In a third aspect, an embodiment of the present disclosure also provides an electronic device, comprising:

a processor and a memory;

The processor is configured to execute steps of the fragmentation model generation method as described above by invoking programs or instruction stored in the memory.

In a fourth aspect, an embodiment of the present disclosure also provides a non-transitory computer-readable storage medium storing programs or instructions, which cause the computer to execute steps of the fragmentation model generation model as described above.

DESCRIPTION OF THE DRAWINGS

Throughout the accompanying drawings, the same or similar reference numbers indicate the same or similar elements. It should be understood that the accompanying drawings are schematic and that the components and elements are not necessarily drawn to scale.

FIG. 1 illustrates a flowchart of a fragmentation model generation method in an embodiment of the present disclosure;

FIG. 2 illustrates a schematic diagram of an application scenario in an embodiment of the present disclosure;

FIG. 3 illustrates a flowchart of a fragmentation model generation method in an embodiment of the present disclosure;

FIG. 4 illustrates a schematic diagram of a three-dimensional data model of an embodiment of the present disclosure;

FIG. 5 illustrates a flowchart of a fragmentation model generation method in an embodiment of the present disclosure;

FIG. 6 illustrates a schematic diagram of three-dimensional point sampling in an embodiment of the present disclosure;

FIG. 7 illustrates a flowchart of a fragmentation model generation method in an embodiment of the present disclosure;

FIG. 8 illustrates a schematic diagram of determination of intersection relationship in an embodiment of the present disclosure;

FIG. 9 illustrates a flowchart of a fragmentation model generation method in an embodiment of the present disclosure;

FIG. 10 illustrates a schematic structural diagram of a fragmentation model generation apparatus in an embodiment of the present disclosure;

DETAILED DESCRIPTION OF PREFERRED EMBODIMENTS

Figure 11:
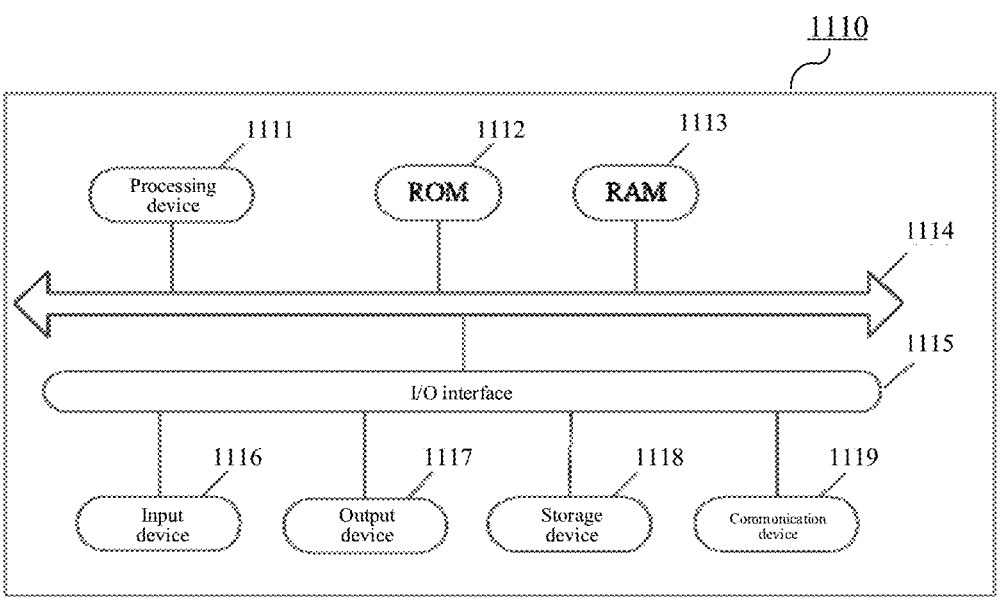
FIG. 11 illustrates a schematic structural diagram of an electronic device in an embodiment of the present disclosure.

Embodiments of the present disclosure will be described in greater detail below with reference to the accompanying drawings. Although certain embodiments of the present disclosure are shown in the accompanying drawings, it should be understood, however, that the present disclosure may be realized in a variety of forms and should not be construed as being limited to the embodiments set forth herein, but rather such embodiments are provided for a more thorough and complete understanding of the present disclosure. It should be understood that the accompanying drawings and embodiments of the present disclosure are for exemplary purposes only and are not intended to limit the protection scope of the present disclosure.

It should be understood that a plurality of steps recited in method embodiments of the present disclosure may be performed in a different order, and/or in parallel. Furthermore, the method embodiments may include additional steps and/or omit performing the illustrated steps. The scope of the present disclosure is not so limited.

As used herein, the term "comprise" and its variations are open-ended, i.e. "comprising but not limited to". The term "based on" is "based at least in part on".

It should be noted that the concepts of "first", "second" and the like mentioned in this disclosure are only used to distinguish between different apparatuses, modules or units, instead of limiting the order or interdependence relationship of functions performed by these apparatuses, modules or units.

It should be noted that the modifiers of "one" and "a plurality of" as mentioned in the present disclosure are schematic and not limiting, and should be understood by those skilled in the art to mean "one or more", unless explicitly stated otherwise in the context.

The names of messages or information interacted between the plurality of apparatuses in embodiments of the present disclosure are used for illustrative purposes only and are not intended to place limitations on the scopes of those messages or information.

Nowadays, three-dimensional data models are widely used, such as games (3D games) and movies implemented using three-dimensional stereoscopic models, etc., which usually require application of explosion or fragmentation effects to scenes or objects within the games or movies, but the explosion effects would take up a large amount of resources and memory for computation in the process of implementation, which is not convenient for real-time computation, resulting in frequent stagnation in the games. At present, in many 3D games, the pre-calculation manner is usually used, i.e., a fragmentation model for an object after fragmentation is pre-calculated before the game runs, and when the explosive fragmentation occurs during the game runs, only a complete object model before fragmentation is replaced with the fragmentation model after the fragmentation. However, by means of the pre-calculation manner, no matter which orientation of the object model the user fragments the object model, the fragmentation model finally presented is fixed, which seriously affects the user's experience; secondly, the pre-calculated fragmentation model tends to occupy a large amount of space, which causes the game to consume more space on the hard disk and the memory, and increases load time of the scene during the game runs. With respect to the above situations existing in the fragmentation model generation, the fragmentation model generation method in the present disclosure will be further specifically described with one or more embodiments hereinafter.

FIG. 1 illustrates a flowchart of a fragmentation model generation method in an embodiment of the present disclosure, which is applicable to a case in which the fragmentation model generation is performed in a client, and the method may be performed by a fragmentation model generation apparatus, which may be implemented using software and/or hardware. The apparatus may be configured in an electronic device, such as a terminal, including, but not limited to, a smartphone, a PDA, a tablet, a wearable device with a display, a desktop, a laptop, an all-in-one computer, a smart home device, and the like. Alternatively, this embodiment is applicable to a case where the fragmentation model generation is performed in a server, the method may be performed by a fragmentation model generation apparatus, which may be implemented using software and/or hardware, and which may be configured in an electronic device, such as a server.

As shown in FIG. 1, the method may include steps S110 to S160 as follows:

S110, acquire a three-dimensional (3D) mesh model for the object to be fragmented.

It shall be understood that the object to be fragmented can refer to a tangible object such as a scene or an object in a real or virtual world, and a 3D mesh model is a model composed of multiple meshes, a mesh is composed of numerous point clouds of a tangible object, and a point cloud includes information such as 3D coordinates (XYZ), laser reflectance intensity (Intensity), color information (RGB), etc. A mesh is usually composed of triangles, quadrilaterals or other simple convex polygons. A 3D mesh model can be composed by acquiring multiple meshes of the object to be fragmented.

As shown in FIG. 2, in a feasible application scenario, a terminal 210 sends a three-dimensional mesh model to a server 220, and the server 220 processes the three-dimensional mesh model by using a fragmentation model generation method, and generate a fragmentation model and send it to the terminal 210, wherein the three-dimensional mesh model of the terminal 210 may be acquired from other terminals or be customizedly generated by the terminal 210; in another feasible application scenario, the terminal 210 may directly process the three-dimensional mesh model by using the fragmentation model generation method, and generate the fragmentation model and send it to the server 220; the fragmentation model generation method provided by embodiments of the present disclosure is not limited to the two possible scenarios as described above.

S120, randomly sample a plurality of 3D points on a surface of the 3D mesh model.

A related technique is to randomly sample 3D points in the interior of the 3D mesh model, and every time a random 3D point is generated, it needs to compute multiple random numbers and judge whether the generated 3D point is inside the 3D mesh model or not. However, in this method, the operation of judging whether the 3D points are inside the 3D mesh model is very time-consuming, and for a non-closed model, it is difficult to judge whether the 3D points are inside the 3D mesh model, and the generation of a large number of random numbers also consumes a certain amount of computation time.

It shall be understood that on the basis of above S110, the three-dimensional mesh model may comprise a plurality of facets each composed by more than 3 edges, the facets being distributed on the surfaces of the three-dimensional mesh model, wherein any one of the facets can be split into one or more triangles and/or quadrilaterals, etc., with no limitation on specific split shapes. A plurality of three-dimensional points are randomly sampled on the surfaces of the three-dimensional mesh model, that is, one or more triangles split from any of the facets of the three-dimensional mesh model each may have one or more randomly sampled three-dimensional points existing therein.

S130, determine a cutting model based on the plurality of three-dimensional points.

It shall be understood that on the basis of the above S120, a Voronoi diagram in the three-dimensional space is calculated based on the determined plurality of three-dimensional points, and a cutting model for the object to be fragmented is generated based on information about points, lines, faces, etc. in the Voronoi diagram, and a specific way of generating the cutting model may employ a relevant technique, etc., and the present disclosure does not limit the way of generating the cutting model. The cutting model includes a plurality of facets.

S140, determine a first bounding box corresponding to a first facet of a surface of the three-dimensional mesh model, and determine a second bounding box corresponding to a second facet of a surface of the cutting model.

In a related technique, in order to improve the efficiency of fragmentation computation, a bounding box is adopted as an accelerator, i.e., a rectangular bounding box is established for each facet of the generated cutting model and the cut model (i.e., the aforementioned three-dimensional mesh model) respectively, and if there exists an intersection of a bounding box corresponding to the cutting model with a bounding box corresponding to the cut model, then it is computed whether or not the facets corresponding to the two models respectively intersect, as well as intersection points and intersection lines; if there is no intersection between a bounding box corresponding to any of the facets in the cutting model and a bounding box corresponding to any of the facets in the 3D mesh model, then the two facets must not intersect, and thus there is no need to calculate the intersection, thus avoiding time-consuming intersection computation.

It shall be understood, on the basis of the above S110 and S130, a first bounding box corresponding to each first facet of a surface of the three-dimensional mesh model can be determined, wherein a surface of the three-dimensional mesh model comprises a plurality of facets, each facet may be composed of more than three edges connected end to end in sequence, each facet comprises one or more first facets, the first facet may be considered as being obtained by splitting each facet, the first facet may be understood as a triangle, and a second bounding box corresponding to each second facet of a surface of the cutting model generated according to the three-dimensional mesh model is determined, the second facet has the same definition as the first facet and will not be repeated herein, and the first bounding box corresponding to the first facet and the second bounding box corresponding to the second facet may be determined by using related techniques.

S150, based on coordinate information of the first bounding box and coordinate information of the second bounding box, determine information about intersection between the first facet and the second facet.

It shall be understood, on the basis of the above S140, based on information about coordinate ranges of the first bounding box and the second bounding box on XYZ axes in a spatial coordinate system respectively, the information about intersection between the first facet and the second facet, i.e., whether or not to intersect, is determined, and determining whether the first bounding box and the second bounding box intersect directly or not on the basis of the coordinate information can reduce computation of intersection between the first bounding box and the second bounding box.

S160, based on the information about intersection, generate a fragmentation model corresponding to the three-dimensional mesh model.

It shall be understood that on the basis of the above S150, the fragmentation model corresponding to the three-dimensional mesh model is generated based on the determined information about intersection between each first facet and each second facet, wherein the fragmentation model can be generated based on the information about intersection by using related techniques and the like, which will not be repeated herein.

An embodiment of the present disclosure provides a fragmentation model generation method, comprising: acquiring a three-dimensional mesh model for an object to be fragmented; randomly sampling a plurality of three-dimensional points on a surface of the three-dimensional mesh model; determining a cutting model on the basis of the plurality of three-dimensional points; determining a first bounding box corresponding to a first facet of the surface of the three-dimensional mesh model, and determining a second bounding box corresponding to a second facet of a surface of the cutting model; determining information about intersection between the first facet and the second facet based on coordinate information of the first bounding box and coordinate information of the second bounding box; and generating a fragmentation model corresponding to the three-dimensional mesh model on the basis of the information about intersection. The first bounding box and the second bounding box can be directly determined based on the coordinate information of the first bounding box and the coordinate information of the second bounding box, which reduces calculation of intersection between the first bounding box and the second bounding box, and effectively reduces the amount of computation and memory space occupied by the fragmentation model generation, and a corresponding fragmentation model can be obtained based on the three-dimensional mesh model in real time, the processing efficiency is high and the user's experience can be improved.

Based on the above embodiments, randomly sampling a plurality of 3D points on a surface of the 3D mesh model may include the following steps S310 to S330 as shown in FIG. 3:

It shall be understood that the 3D mesh model is composed of a plurality of meshes each being an irregular polygonal facet, wherein an irregular polygonal facet may be split into a plurality of triangular facets and/or quadrilateral facets, and the triangular facets will be mainly described in the following embodiments.

Exemplarily, taking the three-dimensional mesh model on the XYZ axes in the spatial coordinate system shown in FIG. 4 as an example, with $T_i$ denoting a facet, i ranges from 1 to the number of facets included in the three-dimensional mesh model, wherein $T_1$ denotes a first facet of a surface of the three-dimensional mesh model, $T_1$ is a triangular facet, $T_2$ denotes a second facet of the surface of the three-dimensional mesh model, $T_2$ is an irregular quadrilateral facet, and it is possible to split $T_2$ into 2 triangular facets, and for the convenience of subsequent calculations, an irregular polygonal facet is split into multiple triangular facets, and the first facet refers to a triangular facet in the following descriptions.

It shall be understood that each first facet included in the three-dimensional mesh model for the object to be fragmented is numbered.

S310, determine a first cumulative area of the first facet of a surface of the 3D mesh model.

It shall be understood, on the basis of the above embodiment, a first cumulative area of each first facet of the surface of the 3D mesh model is determined, and exemplarily, the first facet $T_1$ is numbered 1 and the corresponding first cumulative area is denoted as $A_1$, and the facet $T_2$ is numbered 2 and the corresponding first cumulative area is denoted as $A_2$, wherein two first facets are included in $T_2$, the first cumulative area $A_2$ corresponding to $T_2$ is the sum of the first cumulative area $A_1$ and the areas of the two first facets included in the facet $T_2$.

S320, based on the number of three-dimensional points and the total area of the surfaces of the three-dimensional mesh model, determine a second cumulative area of each three-dimensional point.

It shall be understood, based on the above S310, the number of randomly sampled three-dimensional points is determined, and based on the number of three-dimensional points and the total area of the surfaces of the three-dimensional mesh model, a second cumulative area of each randomly sampled three-dimensional point is determined, i.e., the first cumulative area represents the area of each first facet of the surface of the three-dimensional mesh model, and the second cumulative area represents the area of each 3D point randomly determined on the surface of the three-dimensional mesh model.

For example, determining a second cumulative area of each three-dimensional point based on the number of three-dimensional points and the total area of the surfaces of the three-dimensional mesh model, includes: generating a random initial area based on the number of three-dimensional points and the total area of the surfaces of the three-dimensional mesh model; and determining a second cumulative area of each three-dimensional point based on the random initial area, the number of three-dimensional points, and the total area of the surfaces of the three-dimensional mesh model.

It shall be understood, a random initial area is generated based on the number of sampled 3D points and the total area of all first facets included on the surface of the 3D mesh model, wherein for each 3D mesh model, only one random initial area needs to be calculated after determination of randomly sampled 3D points, and subsequently, a second cumulative area of each randomly sampled 3D point is determined based on the random initial area, the number of 3D points, and the total area of the surface of the 3D mesh model.

For example, the random initial area is positively correlated with an average area, wherein the average area is determined based on a total area of the surface of the three-dimensional mesh model and the number of three-dimensional points; and the second cumulative area of any three-dimensional point is the sum of the random initial area and an increment corresponding to that three-dimensional point, wherein the increment corresponding to that three-dimensional point is positively correlated with the serial number of that three-dimensional point, and positively correlated with the average area.

It shall be understood, a formula for calculating the random initial area may be; $A0=S\times r/M$, where $A0$ is the random initial area, S is the total area of the surface of the 3D mesh model, r is a random number between 0 and 1, M is the number of 3D points, the average area can be expressed as S/M, r can serve as a coefficient, and the average area can be interpreted as the area occupied by each 3D point; a formula for calculating the second cumulative area can be; $Aj=A0+j\times S/M$, where $Aj$ is the second cumulative area of the jth 3D point, j is the 3D point serial number, and S/M is the average area; $j\times S/M$ denotes the increment corresponding to the 3D point.

Exemplarily, taking the facets $T_1$ and $T_2$ in FIG. 4 as an example, with reference to the above formulas for calculating the random initial area as well as the second cumulative area, the three-dimensional mesh model of FIG. 4 comprises N first facets, with each first facet being denoted as $T_1$, wherein i is an integer number ranging from 1 to N, and S may denote the sum of the areas of all facets (i.e., the sum of $A_i$ corresponding to the $T_i$); and the second cumulative area denotes an area of each of the three-dimensional points, which is determined based on the random initial area, the number of 3D points, the serial number of each 3D point in the number of 3D points, and the total area of the surface of the 3D mesh model.

S330, based on the first cumulative area and the second cumulative area, determine a position of each 3D point on the surface of the 3D mesh model.

It shall be understood, on the basis of above S320, when sampling on the surface of the three-dimensional mesh model, it only need to calculate the random number (i.e., the random initial area) once, which allows determining the second cumulative areas of the different three-dimensional points, in turn allows determining the position of each of the three-dimensional points on the surface of the three-dimensional mesh model, i.e., there is no need to calculate the plurality of random numbers when the surface of the three-dimensional mesh model is sampled, which, compared to the related techniques, may improve the sampling efficiency.

For example, determining a position of each 3D point on the surface of the 3D mesh model based on the first cumulative area and the second cumulative area, comprises: determining, based on the first cumulative area and the second cumulative area, a first facet in which the three-dimensional point is located and information about area offset of the 3D point within the first facet; and determining, based on the area offset information, a position of the 3D point within the first facet.

It shall be understood, based on the first cumulative area and the second cumulative area, it is determined which first facet (triangle) of the 3D mesh model each randomly sampled 3D point is specifically located in, for example, the first cumulative area corresponding to the ith first facet is Ai, $i=1, 2, 3, \ldots, N$, where N denotes the number of first facets; the second cumulative area corresponding to the jth 3D point is Aj, $j=1, 2, 3, \ldots, M$, where M denotes the number of 3D points. If $Ak \leq Aj < Ak+1$, that is, when the value of i is k, then it is determined that the jth 3D point is located on the kth first facet, where $A_k$ denotes the first cumulative area of the kth first facet, and $A_{k+1}$ denotes the first cumulative area of the k+1th first facet.

For example, the area offset information can be determined by calculating a offset ratio of the 3D point within the first facet as: $(Aj-Ak)/(Ak+1-Ak)$, or can be generated by calculating a offset area as: $(Aj-Ak)$.

An embodiment of the present disclosure provides a fragmentation model generation method which comprises determining a first cumulative area of a first facet of a surface of a three-dimensional mesh model, determining a second cumulative area of each three-dimensional point based on the number of three-dimensional points and a total area of the surface of the three-dimensional mesh model, determining a position of each three-dimensional point on the surface of the three-dimensional mesh model based on the first cumulative area and the second cumulative area, and only one random initial area needs to be calculated, without needing calculation of a plurality of random numbers, and the second cumulative area of each three-dimensional point can be determined, and in turn, a specific first facet of the three-dimensional mesh model, in which the three-dimensional point on the surface of the three-dimensional mesh model is located, can be quickly determined, the amount of computation can be reduced effectively so as to facilitate subsequent determination of the specific position of each three-dimensional point.

On the basis of the above embodiment, the first facet is a triangle, and determining the position of each three-dimensional point within the first facet based on the area offset information includes the following steps S510 to S540 as shown in FIG. 5:

S510, generate a parallelogram corresponding to the triangle.

It shall be understood, on the basis of the above embodiment, it is determined that the first facet of the surface of the 3D mesh model is a triangle, and a corresponding parallelogram is generated based on each triangle.

Exemplarily, as shown in FIG. 6, a parallelogram ABCD is generated based on a first facet (triangle ABC), a triangle ACD is symmetrically obtained based on the centroid O, where triangle ABC is equivalent to triangle ACD, so that the parallelogram ABCD is obtained.

S520, uniformly divide the parallelogram into a plurality of sub-parallelograms of the same area.

It shall be understood, based on above S510, the parallelogram is uniformly divided into G*G sub-parallelograms of the same area.

Exemplarily, taking FIG. 6 as an example, a parallelogram ABCD is divided into 16, i.e., (4*4), sub-parallelograms of the same area with dashed lines.

S530, determine a third cumulative area of each sub-parallelogram.

It shall be understood, on the basis of above S520, determining the third cumulative area of each sub-parallelogram can be implemented by calculating the area of the first facet, e.g., if the area of the first facet (i.e., the triangle ABC) is 8, the area of the parallelogram ABCD is 16, and the area of each sub-parallelogram is 1. The 16 sub-parallelograms included in the parallelogram ABCD can be numbered, for example, can be numbered in order from top to bottom and from left to right, and then the correlation between the third cumulative area and each of the serial numbers is determined, with reference to FIG. 6, each row is numbered in order from left to right and serial numbers 1 to 16 can be determined, the digit within each of the 16 sub-parallelograms uniformly divided is the corresponding serial number of the respective sub-parallelogram, and the sub-parallelogram in the first row and the first column has a serial number 1, and the corresponding third cumulative area is 1, the sub-parallelogram in the first row and the second column has a serial number 2 and the corresponding third cumulative area is 2, and the sub-parallelogram numbered 5 has a corresponding third cumulative area of 5; where the specific numbering method as well as the order are not limited, as long as the correlation between each cumulative area and the triangle ABC can be determined, that is, it is determined that whether each sub-parallelogram corresponding to the third cumulative area is inside the the first facet (triangle ABC), outside the first facet, or partially inside the first facet. For example, the sub-parallelogram corresponding to serial number 1 in FIG. 6 has part of its area inside the first facet, if according to the current calculation rules (serial numbers as shown in FIG. 6 as well as the setup rules for the third cumulative area), based on the area offset information, it is determined that the three-dimensional point is on the base side of the sub-parallelogram, and it is further determined that the three-dimensional point is inside the triangle ABC; the third cumulative area corresponding to the serial number 5 is inside the triangle ABC. The determination of locations of all three-dimensional points within the triangle ABC needs to be based on the same calculation rule; wherein the third cumulative area 2 of the sub-parallelogram numbered 2 may be the sum of areas of the sub-parallelogram numbered 1 and the sub-parallelogram numbered 2, i.e., the sum of areas of two sub-parallelograms, wherein 1 plus 1 is equal to 2, i.e., the sub-parallelogram numbered 2 has an area of 1 and has a corresponding third cumulative area of 2. The third cumulative area corresponding to the sub-parallelogram numbered 5 is 5, which can be regarded as the sum of areas of 5 sub-parallelograms, and the third cumulative areas of the other numbered subparallelograms can be similarly determined, and so on.

S540, based on the area offset information and the third cumulative area, determine the position of each three-dimensional point within the first facet.

For example, the position of each three-dimensional point within the first facet can be determined by, if it is determined that the three-dimensional point is outside of the first facet by using the area offset information and the third cumulative area, performing central symmetrization based on the center point of the parallelogram to obtain the position of each three-dimensional point within the first facet.

It shall be understood, on the basis of the above S530, based on the area offset information and the third cumulative area, the relationship between the area offset information and the third cumulative area corresponding to the sub-parallelogram is determined, and in turn, the relationship between the three-dimensional point and the first facet is determined, if the three-dimensional point is inside the first facet, the position of the three-dimensional point is directly determined, and if it is determined that the three-dimensional point is outside of the first facet, then central symmetrization is performed to the the three-dimensional point based on the centroid of the parallelogram, so that the position of each three-dimensional point inside the first facet can be obtained.

Exemplarily, as shown in FIG. 6, within the parallelogram ABCD including the center point O, where the 3D point P is inside the first facet, i.e., the triangle ABC, and the position of the 3D point P is directly determined as the sampling point position; the 3D point R is outside the first facet and inside the triangle ACD, and then the symmetrization is performed based on the center point O to obtain the 3D point Q, at this time, the 3D point Q is inside the first facet (triangle ABC), and the position of the 3D point Q is determined as the 3D point position; the 3D point T is outside the first facet, and similarly, the symmetrization method can also be used to determine the position of a symmetrical point of the 3D point T in the first facet. How to determine whether the 3D point is inside or outside the first face can refer to the following example.

Exemplarily, referring to FIG. 6, taking the offset area being the area offset information as an example, an offset area corresponding to the three-dimensional point R is 2, and it can be determined that the R point is on a sub-parallelogram with a third cumulative area of 2, i.e., the position of the R point marked on FIG. 6. The R point is also on the line segment L1L2, that is, the offset area of 2 is converted onto a sub-parallelogram. By means of an area calculation manner of multiplying base by height, based on the same height, the specific position of the 3D point on the base side of the sub-parallelogram corresponding to the offset area is determined. The offset area of 2 is exactly the sum of areas of two sub-parallelograms, and the 3D point R can be converted to an endpoint of the sub-parallelogram numbered 2 in L1L2. At the same time, it can be determined that the point R is outside the triangle ABC, and subsequently the point R is centrally symmetrized to obtain a symmetry point Q of the point R. The point Q is inside the triangle ABC, and the point Q is the position of the three-dimensional point. If the offset area corresponding to the 3D point T is 3.5, the offset area 3.5 minus the area sum 3 of 3 sub-parallelograms (the third cumulative area corresponding to serial number 3 is 3) yields a remaining area of 0.5 which can be regarded as one half of the area of the sub-parallelogram numbered 4 (each sub-parallelogram has an area of 1). The remaining area of 0.5 divided by the height (which is 1) yields a base side length of 0.5, and it can be determined that the three-dimensional point T falls on the base side of the sub-parallelogram numbered 4 (the base side on the line segment L1L2), and it can be determined that the point T is outside the triangle ABC at this time. Subsequently, central symmetrization is applied to point T to determine the position of a symmetry point of point T inside the triangle ABC. If the offset area corresponding to the three-dimensional point P is 5, which is the sum of areas of five sub-parallelograms (the third cumulative area corresponding to the serial number 5), then it means that point P falls on the base side of the numbered 5 sub-parallelogram shown in FIG. 6 (the base side on the line segment L3L4), and it is further determined that point P is inside the triangle ABC, and the position of point P can be directly regarded as the position of the sampling point. Also for example, when the 3D point corresponds to an offset area of 1.5, it can be determined that the 3D point is located in the middle of the base side of the sub-parallelogram numbered 2. Wherein, the bottom side of the sub-parallelogram numbered 2 is on the transverse dashed line (line segment L1L2) where the R point is located, the central symmetrization is applied to the three-dimensional point to obtain a symmetry point of the three-dimensional point falling within the triangle ABC, and the symmetry point of the three-dimensional point is the position of the sampling point.

An embodiment of the present disclosure provides a fragmentation model generation method which comprises generating a parallelogram corresponding to a triangle, uniformly dividing the parallelogram into a plurality of sub-parallelograms with the same area, determining a third cumulative area of each sub-parallelogram, and based on area offset information and the third cumulative area, determining a position of each three-dimensional point within a first facet, the specific position of the three-dimensional point in the first facet can be directly determined, without needing to perform a time-consuming judgment operation about whether the three-dimensional point is inside or outside the three-dimensional mesh model, and the efficiency of the sampling calculation can be improved efficiently.

On the basis of the above embodiment, the determining information about intersection between the first facet and the second facet based on coordinate information of the first bounding box and coordinate information of the second bounding box includes the following steps S710 to S750 as shown in FIG. 7:

S710, determine a bounding box for the 3D mesh model.

It shall be understood, a related technique may be employed to determine the bounding box for the three-dimensional mesh model, wherein the bounding box may be an axial-aligned bounding box (AABB-type bounding box), i.e., a bounding box whose constituent facets all are aligned on the XYZ axes of the spatial coordinate system.

S720, divide the bounding box for the 3D mesh model into multiple voxels.

It shall be understood, on the basis of above S710, after being determined, the bounding box for the entire 3D mesh model may be uniformly divided into a plurality of cuboids, each of which may be referred to as a voxel.

Exemplarily, as shown in FIG. 8, the bounding box for the 3D mesh model is uniformly divided into 6 cuboids which are mapped to a schematic diagram of the bounding box on a two-dimensional plane, with H1 to H6 indicating 6 voxels of the bounding box of the three-dimensional mesh model on the plane.

S730, based on coordinate information of the first bounding box, a first correspondence between the first bounding box and the voxels is determined.

It shall be understood, on the basis of the above S720, based on coordinate information of the first bounding box corresponding to each first facet of the surface of the three-dimensional mesh model, the first correspondence between the first bounding box and voxels, i.e., the intersection relationship between the first bounding box and each voxel, can be directly determined.

Exemplarily, as shown in FIG. 8, according to the coordinate range of the first bounding box B1, it can be directly determined that B1 corresponds to (intersects with) the voxels H1, H2, H3, and H4 within the bounding box of the three-dimensional mesh model, and there is no need to carry out calculation of intersections of the first bounding box and the 6 voxels within the bounding box of the three-dimensional mesh model in sequence and then further determine whether the first bounding box intersects the 6 voxels in the bounding box of the 3D mesh model or not based on the results of the intersection calculation.

S740, based on the coordinate information of the second bounding box, a second correspondence between the second bounding box and the voxels is determined.

It shall be understood, on the basis of the above S720, based on the coordinate information of the second bounding box corresponding to each second facet of the surface of the cut model, the second correspondence between the second bounding box and the voxels in the bounding box of the three-dimensional mesh model, i.e., the intersection relationship between the second bounding box and each voxel, is directly determined.

Exemplarily, as shown in FIG. 8, based on the coordinate range of the second bounding box B2, it is determined that B2 corresponds to voxels H3 and H5, respectively.

S750, based on the first correspondence and the second correspondence, information about intersection between the first facet and the second facet is determined.

It shall be understood, based on the first correspondence corresponding to the first facet in the three-dimensional mesh model and the second correspondence corresponding to the second facet in the cut model, i.e., the first correspondence represents the one or more voxels corresponding to the first bounding box and the second correspondence represents the one or more voxels corresponding to the second bounding box. Among others, the voxels are determined for the bounding boxes of the three-dimensional mesh model, and based on whether the same voxel exists between the voxels corresponding to the first bounding box and the voxels corresponding to the second bounding box, the information about intersection between the first bounding box and the second bounding box is determined, i.e., whether the first bounding box intersects with the second bounding box, and in turn, the information about intersection between the first voxel and the second voxel is determined, i.e., whether the first voxel intersects with the second voxel, and all pairs of voxels each that may have an intersection relationship can be obtained, and a pair of voxels include the first voxel and the second voxel.

Exemplarily, as shown in FIG. 8, the first bounding box B1 for the first facet corresponds to voxels H1, H2, H3, and H4, and the second bounding box B2 for the second facet corresponds to voxels H3 and H5. The same voxel H3 exists between the first bounding box B1 and the second bounding box B2, and thus it can be directly derived that there exists an intersection relationship between the first bounding box B1 and the second bounding box B2. The first facet and the second facet belong to a facet pair that may have an intersection relationship, i.e., the first facet and the second facet are a candidate facet pair.

An embodiment of the present disclosure provides a fragmentation model generation method which comprises determining an bounding box for a three-dimensional mesh model; dividing the bounding box for the three-dimensional mesh model into a plurality of voxels; determining a first correspondence between the first bounding box and the voxels based on coordinate information of the first bounding box; determining a second correspondence between the second bounding box and the voxels based on coordinate information of the second bounding box; and determining information about intersection between the first facet and the second facet based on the first correspondence and the second correspondence. It does not need to carry out the calculation for intersection between the first bounding box or the second bounding box and the voxels, instead, the intersection with the voxels, i.e., the intersection between the first bounding box and the voxels, the intersection between the second bounding box and the voxels, can be directly derived based on the ranges of the coordinate information of the first bounding box or the second bounding box, which can reduce the computation time and computation amount to a certain extent, and there is no need to traversely calculate the information about intersection between the voxels and the first bounding box, so that the pairs of voxels that do not have an intersection relationship therebetween can be removed quickly.

Based on the above embodiment, determining information about intersection between the first facet and the second facet based on the first correspondence and the second correspondence includes the following steps S910 to S930 as shown in FIG. 9:

S910, based on the first correspondence and the second correspondence, determine a candidate facet pair that may have an intersection relationship, wherein the candidate facet pair is composed of a first facet and a second facet.

It shall be understood, based on the first correspondence between the first bounding box and the voxels and the second correspondence between the second bounding box and the voxels, a plurality of candidate facets pairs in which an intersection relationship exists between the first facet and the second facet are determined, e.g., in FIG. 8, the first bounding box B1 for the first facet and the second bounding box B2 for the second facet may be regarded as a candidate facet pair in which an intersection relationship exists.

S920, based on vertex distribution of the first facet and vertex distribution of the second facet, exclude facet pairs that do not intersect from the candidate facet pairs that may have intersection relationships, to obtain facet pairs with intersection relationships.

It shall be understood, on the basis of the above S910, after having obtained candidate facet pairs that may have intersection relationships, based on vertex distribution of the first facet and vertex distribution of the second facet in each of the candidate facet pairs, facet pairs that do not intersect are excluded from the candidate facet pairs that may have intersection relationships, and accurate facet pairs that have intersection relationships can be obtained. It can be determined whether there exists the intersection by judging whether the vertices of the second facet are located on the same side of a plane where the first facet is located. If so, then it can be stated that the first and second facets do not intersect; if not, then it can be stated that first and second facets may intersect.

S930, based on the facet pairs with intersection relationships, determine the information about intersection between the first facet and the second facet.

It shall be understood, on the basis of above S920, for each of the facet pairs with intersection relationships, the information about intersection between the first facet and the second facet can be accurately calculated, i.e., calculation of intersection between the triangles (between the first facet and the second facet) is carried out, and then the information about intersection between the first facet and the second facet can be accurately calculated.

An embodiment of the present disclosure provides a fragmentation model generation method which comprises, based on the first correspondence and the second correspondence, determining a candidate facet pair that may have an intersection relationship, wherein the candidate facet pair is composed of a first facet and a second facet, based on vertex distribution of the first facet and vertex distribution of the second facet, excluding facet pairs that do not intersect from the candidate facet pairs that may have intersection relationships to obtain facet pairs with intersection relationships, and based on the facet pairs with intersection relationships, determining the information about intersection between the first facet and the second facet, so that it is possible to quickly determine facet pairs in which the intersection relationship may exist, and then it is possible to accurately verify the facet pairs in which the intersection relationship may exist, which effectively reduces the intersection computation and ensures the accuracy of the obtained intersection facet pairs.

On the basis of the above embodiment, based on the information about intersection between the first facet and the second facet, an explosive fragmentation algorithm (fragmentation model generation algorithm) in the relevant technique can be employed to execute subsequent steps so as to generate a fragmentation model corresponding to the three-dimensional mesh model.

FIG. 10 illustrates a schematic structural diagram of a fragmentation model generation apparatus in an embodiment of the present disclosure. The fragmentation model generation apparatus provided in the embodiments of the present disclosure may be configured in a client, or may be configured in a server, and the fragmentation model generating apparatus 1000 comprises:

an acquisition unit 1100 configured to acquire a three-dimensional mesh model for an object to be fragmented;

a sampling unit 1200 configured to randomly sample a plurality of three-dimensional points on a surface of the three-dimensional mesh model;

a cutting model determination unit 1300 configured to determine a cutting model on the basis of the plurality of three-dimensional points;

a bounding box determination unit 1400 configured to determine a first bounding box corresponding to a first facet of the surface of the three-dimensional mesh model, and determine a second bounding box corresponding to a second facet of a surface of the cutting model;

an intersection information unit 1500 configured to determine information about intersection between the first facet and the second facet based on coordinate information of the first bounding box and coordinate information of the second bounding box; and a fragmentation model generation unit 1600 configured to generate a fragmentation model corresponding to the three-dimensional mesh model on the basis of the information about intersection.

For example, to randomly sample a plurality of three-dimensional points on the surface of the three-dimensional mesh model, the sampling unit 1200 is configured to: determine a first cumulative area of a first facet of a surface of a three-dimensional mesh model, determine a second cumulative area of each three-dimensional point based on the number of three-dimensional points and a total area of the surface of the three-dimensional mesh model, determine a position of each three-dimensional point on the surface of the three-dimensional mesh model based on the first cumulative area and the second cumulative area.

For example, to determine a second cumulative area of each three-dimensional point based on the number of three-dimensional points and a total area of the surface of the three-dimensional mesh model, the sampling unit 1200 is configured to: generate a random initial area based on the number of three-dimensional points and the total area of the surface of the three-dimensional mesh model; and determine a second cumulative area of each three-dimensional point based on the random initial area, the number of three-dimensional points and the total area of the surfaces of the three-dimensional mesh model.

For example, the sampling unit 1200 is configured as follows: the random initial area is positively correlated with an average area, wherein the average area is determined based on a total area of the surface of the three-dimensional mesh model and the number of three-dimensional points; and the second cumulative area of any three-dimensional point is the sum of the random initial area and an increment corresponding to that three-dimensional point, wherein the increment corresponding to that three-dimensional point is positively correlated with the serial number of that three-dimensional point, and positively correlated with the average area.

For example, to determine a position of each three-dimensional point on the surface of the three-dimensional mesh model based on the first cumulative area and the second cumulative area, the sampling unit 1200 is configured to determine, based on the first cumulative area and the second cumulative area, a first facet in which each three-dimensional point is located and information about area offset for each three-dimensional point within the first facet; and determine, based on the area offset information, a position of each three-dimensional point within the first facet.

For example, in the sampling unit 1200, one of the facets is a triangle, and to determine, based on the area offset information, a position of each three-dimensional point within the first facet, the sampling unit 1200 is configured to: generate a parallelogram corresponding to a triangle, uniformly dividing the parallelogram into a plurality of sub-parallelograms with the same area, determine a third cumulative area of each sub-parallelogram, and based on area offset information and the third cumulative area, determine a position of each three-dimensional point within the first facet.

For example, to determine a position of each three-dimensional point within the first facet based on area offset information and the third cumulative area, the sampling unit 1200 is configured to: if it is determined that the three-dimensional point is outside of the first facet by using the area offset information and the third cumulative area, perform central symmetrization based on the center point of the parallelogram to obtain the position of each three-dimensional point within the first facet.

For example, to determine information about intersection between the first facet and the second facet based on coordinate information of the first bounding box and coordinate information of the second bounding box, the intersection information determining unit 1500 is configured to determine an bounding box for a three-dimensional mesh model; divide the bounding box for the three-dimensional mesh model into a plurality of voxels; determine a first correspondence between the first bounding box and the voxels based on coordinate information of the first bounding box; determine a second correspondence between the second bounding box and the voxels based on coordinate information of the second bounding box; and determining information about intersection between the first facet and the second facet based on the first correspondence and the second correspondence.

For example, to determine information about intersection between the first facet and the second facet based on the first correspondence and the second correspondence, the intersection information determining unit 1500 is configured to: based on the first correspondence and the second correspondence, determine candidate facet pairs that may have an intersection relationship, wherein the candidate facet pair is composed of a first facet and a second facet, based on vertex distribution of the first facet and vertex distribution of the second facet, exclude facet pairs that do not intersect from the candidate facet pairs with intersection relationships to obtain facet pairs with intersection relationships, and based on the facet pairs with intersection relationships, determine the information about intersection between the first facet and the second facet.

The fragmentation model generation apparatus provided by embodiments of the present disclosure can perform the steps performed by a client or a server in the fragmentation model generation method provided by embodiments of the present disclosure, and can achieve the advantageous effects of the steps, which will not be repeated herein.

FIG. 11 illustrates a schematic structural diagram of an electronic device in an embodiment of the present disclosure. The following specifically refers to FIG. 11 which illustrates a schematic structural diagram of an electronic device 1110 suitable for realizing an embodiment of the present disclosure. The electronic device 1110 in the embodiments of the present disclosure may include, but not limited to, a mobile terminal such as a cell phone, a laptop computer, a digital broadcast receiver, a PDA (personal digital assistant), a PAD (tablet computer), a PMP (portable multimedia player), a vehicle-mounted terminal (e.g., a vehicle navigation terminal), a wearable electronic device, and the like, and a fixed terminal such as a digital TV, a desktop computer, a smart home device, and the like devices, etc., and fixed terminals such as digital TVs, desktop computers, smart home devices, etc. The electronic device illustrated in FIG. 11 is merely an example and should not impose any limitation on the functions and usage scopes of the embodiments of the present disclosure.

As shown in FIG. 11, the electronic device 1110 may include a processing device (e.g., a central processor, a graphics processor, etc.) 1111 that may perform a plurality of appropriate actions and processes based on programs stored in a read-only memory (ROM) 1112 or loaded from a storage device 1118 into a random-access memory (RAM) 1113 to implement the fragmentation model generation method as in embodiments of the present disclosure. Also stored in RAM 1113 are a plurality of programs and data required for operation of electronic device 1110. The processing device 1111, the ROM 1112, and the RAM 1113 are connected to each other via a bus 1114. An input/output (I/O) interface 1115 is also connected to bus 1114.

Typically, the following devices may be connected to the I/O interface 1115; an input device 1116 including, for example, a touch screen, a touch pad, a keyboard, a mouse, a camera, a microphone, an accelerometer, a gyroscope, and the like; an output device 1117 including, for example, a liquid crystal display (LCD), a loudspeaker, a vibrator, and the like; a storage device 1118 including, for example, a magnetic tape, a hard disk, and the like; and a communication device 1119. The communication device 1119 may allow the electronic device 1110 to communicate wirelessly or wiredly with other devices to exchange data. Although FIG. 11 illustrates the electronic device 1110 having a variety of devices, it should be understood that it is not required to implement or have all of the illustrated devices. More or fewer devices may alternatively be implemented or possessed.

In particular, according to embodiments of the present disclosure, the process described above with reference to the flowchart may be implemented as a computer software program. For example, embodiments of the present disclosure include a computer program product comprising a computer program hosted on a non-transitory computer-readable medium, the computer program comprising program codes for executing the method illustrated in the flowchart, thereby implementing the fragmentation model generation method as described above. In such embodiments, the computer program may be downloaded and installed from a network via the communication device 1119, or installed from the storage device 1118, or installed from ROM 1102. The computer program, when executed by the processing device 1111, performs the above-described functions as defined in the methods of embodiments of the present disclosure.

It is noted that the computer-readable medium described above in the present disclosure may be a computer-readable signaling medium or a computer-readable storage medium or any combination thereof. The computer-readable storage medium may be, for example, but not limited to, a system, device, or apparatus of electricity, magnetism, light, electromagnetism, infrared, or semiconductors, or any combination thereof. More specific examples of the computer-readable storage medium may include, but not limited to: electrical connection having one or more wires, portable computer disk, hard disk, random access memory (RAM), read-only memory (ROM), erasable programmable read-only memory (EPROM or flash memory), optical fiber, portable compact disk read-only memories (CD-ROM), optical storage device, magnetic memory device, or any suitable combination of thereof. In the context of the present disclosure, a computer-readable storage medium may be any tangible medium containing or storing programs that may be used by or in conjunction with an instruction execution system, apparatus, or device. In the context of the present disclosure, a computer-readable signal medium may include data signal propagated in a baseband or as part of a carrier that carries computer-readable program codes. Such propagated data signals may take a variety of forms, including but not limited to electromagnetic signals, optical signals, or any suitable combination of the foregoing. The computer-readable signal medium may also be any computer-readable medium other than a computer-readable storage medium that sends, propagates, or transmits programs for being uses by, or in conjunction with, an instruction execution system, apparatus, or device. The program codes contained on the computer-readable medium may be transmitted via any suitable medium, including, but not limited to: wire, optic fiber, RF (radio frequency), etc., or any suitable combination of the foregoing.

In some implementations, the client, server may communicate by utilizing any currently known or future developed network protocol such as HTTP (HyperText Transfer Protocol), and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer-readable medium may be contained in the above electronic device; or it may stand alone, without being assembled into the electronic device.

The above computer-readable medium may carry one or more programs, which, when executed by the electronic device, cause the electronic device to: acquire a three-dimensional mesh model for an object to be fragmented; randomly sample a plurality of three-dimensional points on a surface of the three-dimensional mesh model; determine a cutting model on the basis of the plurality of three-dimensional points; determine a first bounding box corresponding to a first facet of the surface of the three-dimensional mesh model, and determine a second bounding box corresponding to a second facet of a surface of the cutting model; determine information about intersection between the first facet and the second facet based on coordinate information of the first bounding box and coordinate information of the second bounding box; and generate a fragmentation model corresponding to the three-dimensional mesh model on the basis of the information about intersection.

For example, when one or more of the above-described programs are executed by the electronic device, the electronic device may also perform other steps of the above-described embodiments.

Computer program codes for performing the operations of the present disclosure may be written in one or more programming languages, or combinations thereof, including, but not limited to, object-oriented programming languages, such as Java, Smalltalk, C++, and conventional procedural programming languages, such as the "C" language or the like. The program codes may be executed entirely on the user's computer, partially on the user's computer, as a stand-alone software package, partially on the user's computer and partially on a remote computer, or entirely on a remote computer or server. In the case involving a remote computer, the remote computer may be connected to the user computer via any kind of network, including a local area network (LAN) or a wide area network (WAN), alternatively, it may be connected to an external computer (e.g., by utilizing an Internet service provider to connect via the Internet).

The flowcharts and block diagrams in the accompanying drawings illustrate the architecture, functions, and operations of systems, methods, and computer program products that may be implemented in accordance with various embodiments of the present disclosure. At this point, each block in the flowcharts or block diagrams may represent a module, program segment, or a portion of codes that contains one or more executable instructions for implementing a specified logical function. It should also be noted that in some alternative implementations, the functions labeled in the blocks may also occur in a different order than those labeled in the accompanying drawings. For example, two boxes that are consecutively represented may actually be executed substantially in parallel, and they may sometimes be executed in the reverse order, depending on the functions involved. It is also noted that each or combination of the blocks in the block diagrams and/or flowcharts may be implemented with a specialized hardware-based system that performs the specified functions or operations, or may be implemented with a combination of specialized hardwares and computer instructions.

The involved units described in embodiments of the present disclosure may be implemented by means of software or may be implemented by means of hardware. Among others, the name of a unit does not impose a limitation on the unit itself in a certain case.

The functions described above herein may be performed, at least in part, by one or more hardware logic components. For example, without limitation, exemplary types of hardware logic components that may be used include: field programmable gate arrays (FPGAs), application-specific integrated circuits (ASICs), application-specific standard products (ASSPs), systems-on-chip (SOCs), complex programmable logic devices (CPLDs), and the like.

In the context of the present disclosure, a machine-readable medium may be a tangible medium that may contain or store programs for use by or in conjunction with an instruction execution system, apparatus, or device. The machine-readable medium may be a machine-readable signal medium or a machine-readable storage medium. The machine-readable medium may include, but not limited to, an electronic, magnetic, optical, electromagnetic, infrared, or semiconductor system, device, or apparatus, or any suitable combination of the foregoing. More specific examples of machine-readable storage media would include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination of the foregoing.

Furthermore, while multiple operations are depicted using a particular order, it should not be construed as requiring that the operations be performed in the particular order shown or in sequential order of execution. Multitasking and parallel processing may be advantageous in certain environments. Similarly, while several specific implementation details are included in the above discussion, these should not be construed as limiting the scope of the present disclosure. Certain features described in the context of separate embodiments may also be implemented in combination in a single embodiment. Conversely, a plurality of features described in the context of a single embodiment may also be implemented in multiple embodiments, either individually or in any suitable sub-combination.

What is claimed is:

1. A fragmentation model generation method, comprising:
acquiring a three-dimensional mesh model for an object to be fragmented;
randomly sampling a plurality of three-dimensional points on a surface of the three-dimensional mesh model;
determining a cutting model on the basis of the plurality of three-dimensional points;
determining a first bounding box corresponding to a first facet of the surface of the three-dimensional mesh model, and determining a second bounding box corresponding to a second facet of a surface of the cutting model;
determining information about intersection between the first facet and the second facet based on coordinate information of the first bounding box and coordinate information of the second bounding box; and
generating a fragmentation model corresponding to the three-dimensional mesh model on the basis of the information about intersection,
wherein randomly sampling the plurality of three-dimensional points on the surface of the three-dimensional mesh model comprises:
determining a first cumulative area of the first facet of the surface of the three-dimensional mesh model,
determining a second cumulative area of each three-dimensional point based on a number of three-dimensional points and a total area of the surface of the three-dimensional mesh model, and
determining a position of each three-dimensional point on the surface of the three-dimensional mesh model based on the first cumulative area and the second cumulative area.

2. The method of claim 1, wherein the determining a second cumulative area of each three-dimensional point based on the number of three-dimensional points and a total area of the surface of the three-dimensional mesh model, comprising:
generating a random initial area based on the number of three-dimensional points and the total area of the surface of the three-dimensional mesh model; and
determining a second cumulative area of each three-dimensional point based on the random initial area, the number of three-dimensional points and the total area of the surface of the three-dimensional mesh model.

3. The method of claim 2, wherein the random initial area is positively correlated with an average area, wherein the average area is determined based on a total area of the surface of the three-dimensional mesh model and the number of three-dimensional points; and wherein the second cumulative area of any three-dimensional point is the sum of the random initial area and an increment corresponding to the three-dimensional point, wherein the increment corresponding to the three-dimensional point is positively correlated with the serial number of the three-dimensional point, and positively correlated with the average area.

4. The method of claim 1, wherein the determining a position of each three-dimensional point on the surface of the three-dimensional mesh model based on the first cumulative area and the second cumulative area, comprises:

determining, based on the first cumulative area and the second cumulative area, a first facet in which each three-dimensional point is located and information about area offset for each three-dimensional point within the first facet; and determine, based on the area offset information, a position of each three-dimensional point within the first facet.

5. The method of claim 4, wherein the first facet is a triangle, and the determining, based on the area offset information, a position of each three-dimensional point within the first facet, comprises:

generating a parallelogram corresponding to the triangle, uniformly dividing the parallelogram into a plurality of sub-parallelograms with the same area, determining a third cumulative area of each sub-parallelogram, and determining a position of each three-dimensional point within the first facet based on the area offset information and the third cumulative area.

6. The method of claim 5, wherein the determining a position of each three-dimensional point within the first facet based on area offset information and the third cumulative area, comprises:

in response to it being determined that the three-dimensional point is outside of the first facet by using the area offset information and the third cumulative area, performing central symmetrization based on the center point of the parallelogram to obtain the position of each three-dimensional point within the first facet.

7. The method of claim 1, wherein the determining information about intersection between the first facet and the second facet based on coordinate information of the first bounding box and coordinate information of the second bounding box, comprises:

determining a bounding box for the three-dimensional mesh model;

dividing the bounding box for the three-dimensional mesh model into a plurality of voxels;

determining a first correspondence between the first bounding box and the voxels based on coordinate information of the first bounding box;

determining a second correspondence between the second bounding box and the voxels based on coordinate information of the second bounding box; and determining information about intersection between the first facet and the second facet based on the first correspondence and the second correspondence.

8. The method of claim 7, wherein the determining information about intersection between the first facet and the second facet based on the first correspondence and the second correspondence, comprises:

based on the first correspondence and the second correspondence, determining a candidate facet pair that may have an intersection relationship, wherein the candidate facet pair is composed of a first facet and a second facet, based on vertex distribution of the first facet and vertex distribution of the second facet, excluding facet pairs that do not intersect from the candidate facet pairs that may have intersection relationships to obtain facet pairs with intersection relationships, and based on the facet pairs with intersection relationships, determining the information about intersection between the first facet and the second facet.

9. An electronic device comprising: a processor and a memory; the processor is configured to, when invoking programs or instructions stored in the memory, perform:

acquiring a three-dimensional mesh model for an object to be fragmented;

randomly sampling a plurality of three-dimensional points on a surface of the three-dimensional mesh model;

determining a cutting model on the basis of the plurality of three-dimensional points;

determining a first bounding box corresponding to a first facet of the surface of the three-dimensional mesh model, and determining a second bounding box corresponding to a second facet of a surface of the cutting model;

determining information about intersection between the first facet and the second facet based on coordinate information of the first bounding box and coordinate information of the second bounding box; and generating a fragmentation model corresponding to the three-dimensional mesh model on the basis of the information about intersection, wherein the processor is configured to, when invoking programs or instructions stored in the memory, randomly sample the plurality of three-dimensional points on the surface of the three-dimensional mesh model by:

determining a first cumulative area of the first facet of the surface of the three-dimensional mesh model, determining a second cumulative area of each three-dimensional point based on a number of three-dimensional points and a total area of the surface of the three-dimensional mesh model, and determining a position of each three-dimensional point on the surface of the three-dimensional mesh model based on the first cumulative area and the second cumulative area.

10. The electronic device of claim 9, wherein the processor is configured to, when invoking programs or instructions stored in the memory, determine a second cumulative area of each three-dimensional point based on the number of three-dimensional points and a total area of the surface of the three-dimensional mesh model, by generating a random initial area based on the number of three-dimensional points and the total area of the surface of the three-dimensional mesh model; and determining a second cumulative area of each three-dimensional point based on the random initial area, the number of three-dimensional points and the total area of the surface of the three-dimensional mesh model.

11. The electronic device of claim 9, wherein the processor is configured to, when invoking programs or instructions stored in the memory, determine a position of each three-dimensional point on the surface of the three-dimensional mesh model based on the first cumulative area and the second cumulative area, by:

determining, based on the first cumulative area and the second cumulative area, a first facet in which each three-dimensional point is located and information about area offset for each three-dimensional point within the first facet; and determine, based on the area offset information, a position of each three-dimensional point within the first facet.

12. The electronic device of claim 11, wherein the first facet is a triangle, and the processor is configured to, when invoking programs or instructions stored in the memory, determine, based on the area offset information, a position of each three-dimensional point within the first facet, by:

generating a parallelogram corresponding to the triangle, uniformly dividing the parallelogram into a plurality of sub-parallelograms with the same area, determining a third cumulative area of each sub-parallelogram, and determining a position of each three-dimensional point within the first facet based on the area offset information and the third cumulative area.

13. The electronic device of claim 9, wherein the processor is configured to, when invoking programs or instructions stored in the memory, determine information about intersection between the first facet and the second facet based on coordinate information of the first bounding box and coordinate information of the second bounding box, by:

determining a bounding box for the three-dimensional mesh model;

dividing the bounding box for the three-dimensional mesh model into a plurality of voxels;

determining a first correspondence between the first bounding box and the voxels based on coordinate information of the first bounding box;

determining a second correspondence between the second bounding box and the voxels based on coordinate information of the second bounding box; and determining information about intersection between the first facet and the second facet based on the first correspondence and the second correspondence.

14. The electronic device of claim 13, wherein the processor is configured to, when invoking programs or instructions stored in the memory, determine information about intersection between the first facet and the second facet based on the first correspondence and the second correspondence, by:

based on the first correspondence and the second correspondence, determining a candidate facet pair that may have an intersection relationship, wherein the candidate facet pair is composed of a first facet and a second facet, based on vertex distribution of the first facet and vertex distribution of the second facet, excluding facet pairs that do not intersect from the candidate facet pairs that may have intersection relationships to obtain facet pairs with intersection relationships, and based on the facet pairs with intersection relationships, determining the information about intersection between the first facet and the second facet.

15. A non-transitory computer-readable storage medium, storing programs or instructions, the programs or instructions causing a computer to perform:

acquiring a three-dimensional mesh model for an object to be fragmented;

randomly sampling a plurality of three-dimensionally points on a surface of the three-dimensional mesh model;

determining a cutting model on the basis of the plurality of three-dimensional points;

determining a first bounding box corresponding to a first facet of the surface of the three-dimensional mesh model, and determining a second bounding box corresponding to a second facet of a surface of the cutting model;

determining information about intersection between the first facet and the second facet based on coordinate information of the first bounding box and coordinate information of the second bounding box; and generating a fragmentation model corresponding to the three-dimensional mesh model on the basis of the information about intersection, wherein the programs or instructions causing a computer to randomly sample the plurality of three-dimensional points on the surface of the three-dimensional mesh model by:

determining a first cumulative area of the first facet of the surface of the three-dimensional mesh model, determining a second cumulative area of each three-dimensional point based on a number of three-dimensional points and a total area of the surface of the three-dimensional mesh model, and determining a position of each three-dimensional point on the surface of the three-dimensional mesh model based on the first cumulative area and the second cumulative area.

16. The non-transitory computer-readable storage medium of claim 15, wherein the programs or instructions causing a computer to determine information about intersection between the first facet and the second facet based on coordinate information of the first bounding box and coordinate information of the second bounding box, by:

determining a bounding box for the three-dimensional mesh model;

dividing the bounding box for the three-dimensional mesh model into a plurality of voxels;

determining a first correspondence between the first bounding box and the voxels based on coordinate information of the first bounding box;

determining a second correspondence between the second bounding box and the voxels based on coordinate information of the second bounding box; and determining information about intersection between the first facet and the second facet based on the first correspondence and the second correspondence.

17. The non-transitory computer-readable storage medium of claim 16, wherein the programs or instructions causing a computer to determine information about intersection between the first facet and the second facet based on the first correspondence and the second correspondence by:

based on the first correspondence and the second correspondence, determining a candidate facet pair that may have an intersection relationship, wherein the candidate facet pair is composed of a first facet and a second facet, based on vertex distribution of the first facet and vertex distribution of the second facet, excluding facet pairs that do not intersect from the candidate facet pairs that may have intersection relationships to obtain facet pairs with intersection relationships, and based on the facet pairs with intersection relationships, determining the information about intersection between the first facet and the second facet.

* * * * *